Figure 1:
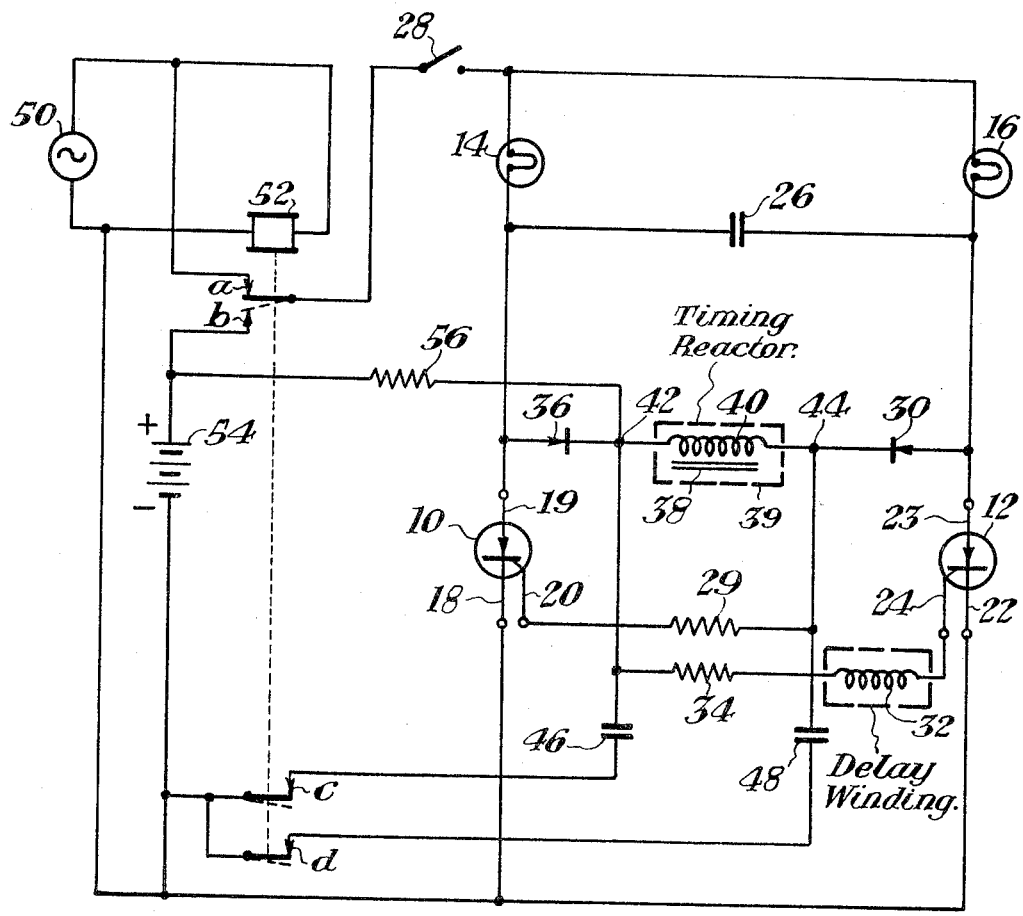

Nov. 1, 1966 O. L. UTT ETAL 3,283,206
ELECTRONIC SWITCHING SYSTEM
Filed July 20, 1961

INVENTORS
Orval L. Utt and
Richard J. Rapacchietta
BY
W. L. Stout
THEIR ATTORNEY 3,283,206
ELECTRONIC SWITCHING SYSTEM
Orval L. Utt, Monroeville, Pa., and Richard J. Rapacchietta, Denver, Colo., assignors to Westinghouse Air Brake Company, Wilmerding, Pa., a corporation of Pennsylvania
Filed July 20, 1961, Ser. No. 125,572
20 Claims. (Cl. 315—201)

This invention relates to a switching system for periodically-operated load elements, and more particularly to an electronic switching system capable of operating from either alternating current energy or direct current energy.

One common application of a switching circuit of this type is in connection with railroad signaling systems in which flashing light signals adapted to attract attention readily are provided where highways cross railway tracks in order to warn users of the highway when a train is near or approaching the crossing. In many cases in the past flasher circuits embodying intermittently operated electromagnetic relays have been used successfully for such a purpose. Relays in general however include a number of movable parts which consume considerable amounts of input power and their contacts are subject to deterioration due to the large number of current interruptions by the contacts.

With these considerations in mind, an object of this invention is the provision of a novel switching circuit for warning devices, such as light signals, in which no moving parts or contact elements are required.

A further object of the invention is to provide a unique switching circuit incorporating static components for controlling the display and cutoff times of a pair of warning devices.

Still a further object of the invention is the provision of a new switching circuit characterized by the abrupt transition of warning devices from their display to their cutoff conditions.

Another object of the invention is to provide a novel switching circuit wherein the components for alternately directing the flow of current through the warning devices are capable of handling currents of considerable amperage.

A particular object of our invention is the provision of a switching circuit which completely fulfills the failsafe requirements typically required of vital warning systems.

A switching circuit illustrating features in accordance with the present invention may include a source of current; a pair of output loads; a pair of current controlling devices respectively in series with each of said loads across said source of current; a reactor including a winding; and a pair of asymmetric units respectively connecting the winding to points intermediate the junctions of the serially connected loads and current controlling devices whereby current is switched alternately from one output load to the other by alternately reversing the polarity of saturation of the reactor.

Figure 2:
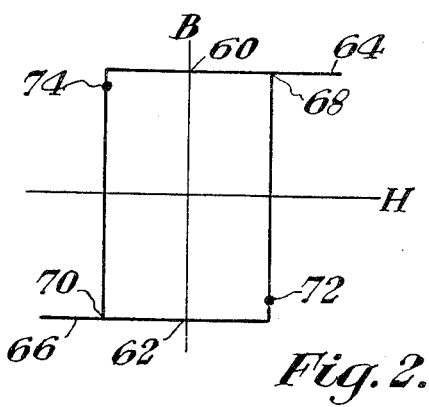

A complete understanding of the invention and an introduction to other objects and features not specifically mentioned may be had from the following detailed description of a specific embodiment thereof when read in conjunction with the appended drawings, wherein:

FIG. 1 is a schematic diagram of a switching circuit illustrating the principles of our invention; and FIG. 2 is a graphic representation of a hysteresis loop for the core material of the reactor preferred for use in this circuit.

Referring now to FIG. 1, there is shown a pair of current switching devices such as controlled rectifiers 10 and 12 arranged to conduct current in the same direction and connected in series, respectively, with suitable utilization devices or loads, herein shown schematically as lamps 14 and 16. Controlled rectifier 10 includes a cathode 18, an anode 19 connected with lamp 14 and with lamp 16 through a condenser 26, and a gate 20. Controlled rectifier 12 includes a cathode 22, an anode 23 connected with lamp 16 and likewise with lamp 14 through condenser 26, and a gate 24. The other ends of lamps 14 and 16 connect jointly with the stationary element of a circuit controller having a movable element designated 28.

Circuit controller 28 may be one element of a track relay, not shown, which is operated in conjunction with a conventional highway crossing warning system for railroads which does not form a part of this invention. When it is desired to permit unrestricted use of a highway at a track intersection, the track relay may be operated so that circuit controller 28 is open. If it is desired to initiate a warning so as to prevent users of the highway from passing over the track, the track relay may be operated so that the circuit controller becomes closed.

As shown, cathodes 18 and 22 are connected in common. Gate 20 of controlled rectifier 10 is cross-connected to anode 23 of controlled rectifier 12 through a resistor 29 and an asymmetric unit, such as a diode 30, whose anode is common-referenced with anode 23. Gate 24 of controlled rectifier 12 is cross-connected to anode 19 of controlled rectifier 10 through an air core winding 32, possessing current delay properties as will be seen, and a resistor 34 in series, and an asymmetric unit, such as a diode 36, whose anode is common-referenced with anode 19. Resistors 29 and 34 function, as will be seen, to limit the value of current in the gate circuits wherein they are connected. Diodes 30 and 36, as well as controlled rectifiers 10 and 12, may be considered ideal so that when in the state of conduction, the voltage across them is substantially zero, and when not conducting, the current flowing through them will for all practical purposes be zero.

The controlled rectifiers are essentially semiconductor devices and their manner of operation and fundamental properties can be found in a number of technical publications, one being the General Electric Company's "Transistor Manual," 3rd edition, 1958, pages 103 and 104. To summarize the description on these pages, if a reverse voltage is impressed on the device (anode negative), it acts as a high impedance to block the flow of anode current. If a forward voltage is impressed on the device (anode positive) and a gate-to-cathode current is applied, the device acts as a low impedance and permits the flow of anode current. To return the controlled rectifier to cutoff once it has been fired, the anode-to-cathode voltage is reduced to zero or the polarity of such voltage is reversed, simultaneously with reducing the gate current.

The reference character 39 designates a timing reactor comprising a core 38 provided with a winding 40. One end of winding 40 is connected to a point 42 in the circuit between resistor 34 and the cathode of diode 36. The other end of winding 40 is connected to a point 44 in the circuit between resistor 29 and the cathode of diode 30. When diodes 36 and 30 are forward-biased, the potential at the respective anodes of controlled rectifiers 10 and 12 will be applied through diodes 36 and 30 to points 42 and 44 in the circuits. However, due to the blocking effect of these diodes, the potential drop across winding 40 may vary without any corresponding variation at the anodes of the controlled rectifiers. One end of a condenser 46 is connected to point 42 in the circuit and through resistor 34 and winding 32 to gate 24 of controlled rectifier 12. Similarly, one end of a condenser 48 is connected to point 44 in the circuit and through resistor 29 to gate 20 of controlled rectifier 10.

For operation from alternating current energy, there is provided across the series-connected lamps and controlled rectifiers a voltage of say 60 c.p.s. from an alternating current source 50 whose terminals are connected to a control relay 52. With relay 52 energized, as shown herein, one terminal of source 50 is connected to the movable element of circuit controller 28 through front contact *a* of relay 52. The other, or lower terminal of source 50 as illustrated in the drawings, is in direct connection with the cathodes 18 and 22 of the controlled rectifiers 10 and 12. This terminal is also connected with the negative terminal of a direct current source which may be a battery 54, having appropriate positive and negative polarity indications. During the alternating current mode of operation, the lower terminal of source 50 is connected to condensers 46 and 48 through front contacts *c* and *d*, respectively, of the relay.

When operation from direct current energy becomes necessary or is desired as, for example, in case of failure of alternating current source 50, relay 52 will be deenergized, causing back contact *b* of relay 52 to close and front contacts *a*, *c* and *d* to open. Under these conditions, condensers 46 and 48 are obviously disconnected from the circuit. Voltage from battery 54 is now applied across the series-connected lamp and controlled rectifiers. For this purpose, a connection extends from the positive terminal of the battery and through back contact *b* of relay 52 to circuit controller 28. The positive terminal of battey 54 is connected to point 42 in the circuit through a resistor 56 chosen preferably with a resistance value many times greater than the resistance of the other resistors 29 and 34.

Summarizing the foregoing, with relay 52 energized, voltage from source 50 will be applied to the circuit embodying our invention. Also, condensers 46 and 48 will be tied in. The third condenser 26, as will appear, is at this time effectively connected across the terminals of source 50 and is superfluous during operation of the circuit in the alternating current mode. On the other hand, with relay 52 deenergized, voltage for operating the indicating lamps and controlled rectifiers 10 and 12 will be supplied solely by battery 54, and condensers 46 and 48 are effectively disconnected from the circuit. The remaining elements of the circuit are retained regardless of the current source employed.

FIG. 2 graphically illustrates the desired magnetic characteristics of core 38 of the timing reactor 39. It can be seen that the magnetic material employed in core 38 should preferably, though not necessarily, exhibit a substantially rectangular hysteresis loop. Cores of this character are well known in the art and, since they are treated exclusively in many contemporary publications relating to magnetic materials, the discussion herein of their operation and properties will be brief. It should be pointed out, however, that our invention is not limited to use with a core material having a precisely rectangular hysteresis character, nor to any specific core configuration, as many applicable variations in the geometry of the core will readily suggest themselves to those skilled in the art.

In the curve of FIG. 2 the magnetizing force H is plotted against the flux density B. Several points on the curve are illustrative of the operation of core 38; namely, points 60 ($+B_r$) and 62 ($-B_r$) which represent points of positive and negative remanence, respectively; the points 64 and 66 which represent the positive and negative regions of saturation, respectively; and the points 68 and 70 which represent, respectively, substantially the beginning of the positive and negative regions of saturation. Assume now that the core magnetization is at point 62 ($-B_r$). A current supplied to the winding in a direction that creates a magnetomotive force tending to drive the core magnetization toward point 68 is resisted by a high impedance in winding 40. With the beginning of saturation at point 68, the winding presents a relatively low impedance allowing a large saturation current to flow. The core magnetization can be returned to negative saturation region merely by reversing the direction of current in winding 40. It follows, therefore, that if the core magnetization is set to one saturation region and is thereafter set by a reverse direction magnetomotive force to the other saturation region, a time delay is achieved commonly determined in volt-seconds. Moreover, because of the retentivity properties of core 40, the applied voltage need not be continuous but may be in the form of unidirectional pulses. In this last case, the core retains the level of flux established by the last of a number of successive pulses.

Before any one flashing operation commences, the reactor 39 is initially set substantially to negative remanence by virtue of a path extending from the positive terminal of battery 54, through resistor 56, winding 40 in one direction, resistor 29, and through the gate 20 to the cathode 18 of controlled rectifier 10 to the negative terminal of the battery. A voltage which causes current to flow in winding 40, that is, from right to left, in a reverse direction, will cause the flux point on the magnetizing curve to begin to rise toward point 68. A portion of the current supplied by the battery also enters the gate circuit of controlled rectifier 12 through resistor 34 and winding 32. It should be pointed out, however, that the value of current in the gate circuit of the two controlled rectifiers prior to the initiation of operation is very small compared to the value of gate current required to gate them into conduction.

ALTERNATING CURRENT OPERATION

To commence operation from alternating source 50 circuit controller 28 is closed. The first positive half-cycle of the input voltage impressed on anodes 19 and 23 tends to initiate conduction in controlled rectifiers 10 and 12. By way of diodes 30 and 36 substantially the full value of the source voltage is applied simultaneously to points 42 and 44 thus providing a gate potential in the gate circuits. Controlled rectifier 10 therefore begins to conduct causing lamp 14 to become lit. The winding 32 serves to delay the building of gate current through controlled rectifier 12 whereupon the absence of this gate current precludes conduction in controlled rectifier 12 so that lamp 16 remains extinguished. During the positive alternation the applied voltage in the one series path is divided between lamp 14 and controlled rectifier 10 with the latter having a small anode-to-cathode voltage drop, as previously mentioned, because of its low resistance state. With controlled rectifier 12 in its blocking state diode 30 is forward-biased, which enables substantially the full value of the applied voltage to be applied to point 44. During this state of operation condenser 48 responds to the potential at point 44 and begins to accumulate a charge. At the same time, due to the coincidence of point 44 with the one end of winding 40, this voltage is applied across winding 40 which permits substantially no charge to build up on condenser 46 due to the resulting low voltage at point 42. The voltage dropped across winding 40 causes a magnetizing current to flow to gate 24 of controlled rectifier 12 over a path which extends from the upper terminal of source 50, through front contact *a* of relay 52, circuit controller 28, lamp 16, diode 30, the winding 40, resistor 34, winding 32, and from the gate to cathode of controlled rectifier 12 to the other terminal of source 50.

In the instant invention the excitation of winding 40 in response to a single positive alternation does not provide sufficient magnetomotive force to reverse the core magnetization from negative remanence point 68 on the curve. Such a voltage merely causes the core magnetization to be moved, or stepped, along the curve from negative remanence to say, for example, a point 72. When the first positive alternation reduces to zero, the magnetization of core 38 is established to a level generally indicated by point 72.

At the start of the succeeding negative half-cycle, controlled rectifier 10 is at once reverse-biased causing current flow therein to cease and lamp 14 to be extinguished. As noted hereinabove, the accumulation of charge on condenser 46 is negligible at this time. As this negative half-cycle continues, condenser 48 seeks a discharge path provided through the gate circuit of controlled rectifier 10 over a path which includes resistor 29, gate 20 and cathode 18, and front contact d of relay 52. In the illustrated embodiment of our invention the components included in the discharge path of condenser 48 have a large enough time constant to continue delivering gate current to controlled rectifier 10 beyond the end of the negative alternation. As a result, at the beginning of the next positive half-cycle, gate-to-cathode current in controlled rectifier 10 is already flowing so that it resumes conduction, controlled rectifier 12 remaining cut off. The presence of this second positive pulse causes the core magnetization to be stepped in the same direction. Again, condenser 48 attains a voltage substantially equal to the peak value of the applied voltage, the charge on condenser 46 from source 50 remaining substantially the same, that is, zero.

Since each positive pulse is effective to move the magnetization of core 38 toward the region 68 on the B–H curve, it can be seen that ultimately, on some positive half-cycle, core 38 will reach the positive saturation state. Due to the saturated condition, the reactance of winding 40 decreases causing the voltage at point 42 to increase. This voltage produces a gate-to-cathode current in controlled rectifier 12 sufficient to place controlled rectifier 12 into conduction. At this time both lamps are lit. Essentially zero voltage now appears at anode 23 of controlled rectifier 12 and condenser 48 at once begins to discharge over the path above described. The positive voltage, however, suddenly impressed at point 42 biases diode 36 in the reverse direction. The effect is that a charge on condenser 46 begins to build up notwithstanding the low anode voltage of controlled rectifier 10 due to its conduction. The charge on condenser 46 continues to accumulate during the remainder of the positive going alternation which caused conduction of controlled rectifier 12. Moreover, the potential drop across condenser 46 rises to a value greater than the voltage applied to point 42. This increase in voltage above the applied voltage is due to the well known fact that, if a voltage is applied to a series RLC circuit, and the resistance in the circuit is sufficiently low, the inductance voltage will literally drive current into the condenser until the inductance energy is exhausted, with the result that when the current ceases the condenser is charged to a voltage greater than the applied voltage. Thus, in the present case, where the RLC circuit elements comprise the resistance of lamp 16 and the forward resistance of diode 30, the inductance of winding 40, and the capacitance of condenser 46, the condenser 46 absorbs additional energy upon collapse of the winding field and thus is overcharged relative to the applied voltage. At the start of the following negative going alternation, the two controlled rectifiers are biased in the reverse direction and both lamps are extinguished.

Thus, during the time represented by the distance on the B–H curve separating the opposing levels of saturation, as the input voltage swings alternately positive and negative, the successive positive going alternations succeed in changing the magnetization of reactor 39 from the condition of negative remanence to saturation in the positive direction. Due to the characteristics of the above-described series RLC circuit it will be understood that condenser 46 is charged to a voltage greater than the voltage on condenser 48.

During the negative swing of the applied voltage immediately following the positive alternation which succeeded in placing reactor 39 at positive saturation, condenser 46 begins to discharge through the gate circuit of controlled rectifier 12 over a path including resistor 34, winding 32, gate 24, cathode 22, and front contact c of relay 52. It can be seen that when the next positive alternation forward biases controlled rectifiers 10 and 12, the gate current through the gate-to-cathode of controlled rectifier 12 is already at some positive value. Consequently, the discharge current of condenser 46 has the same effect as a current emanating from source 50 which results in the instantaneous conduction of controlled rectifier 12 whereby lamp 16 is illuminated. Under these conditions, little or no voltage is impressed at point 44 in the circuit and, therefore, controlled rectifier 10 remains nonconducting due to the lack of an ignition gate current. A correspondingly negligible voltage will now appear across condenser 48. With controlled rectifier 10 cut off, diode 36 is biased in the forward direction relative to the positive alternation whereby condenser 46 charges to substantially the peak value of the applied voltage during each positive alternation, and during each negative alternation, by discharging over the path hereinabove described, delivers ignition gate current to controlled rectifier 12 to cause it to resume conducting in response to successive positive half-cycles of the input voltage. Similarly as before, flow of magnetizing current begins in winding 40, but this time from left to right. During this portion of the flashing cycle the successive positive pulses of magnetizing current create pulses of magnetomotive force in a direction that tend to drive the core magnetization from positive saturation and through say, for example, point 74, to negative saturation. The second path for current magnetizing core 38 extends from the upper terminal of source 50, through front contact a of relay 52, circuit controller 28, lamp 14, diode 36, winding 40, resistor 29, and through the gate 20 to cathode 18 of controlled rectifier 10 to the other terminal of source 50. Saturation in the negative region is therefore eventually attained and the positive voltage of the trigger half-cycle will be fed to point 44 which enables the gate circuit of controlled rectifier 10 to draw current heavily. Controlled rectifier 10 is, therefore, gated into conduction and lamp 14 is switched on. With both controlled rectifiers now in the conducting state substantially no charge builds up on condenser 46. Owing, however, to the same considerations previously discussed in connection with the manner of charging condenser 46, the voltage on condenser 48 overruns the value of the impressed voltage at point 44, the condenser 48 charging to a voltage greater than that applied at point 44 over a second series RLC circuit including the resistance of lamp 14 combined with the forward resistance of diode 36, winding 40, and condenser 48. Upon return of the positive alternation to zero both controlled rectifiers are returned to the nonconducting state. Ignition gate current will now be supplied by condenser 48 through resistor 29 to gate 20 of controlled rectifier 10 so that at the start of the next positive half-cycle controlled rectifier 10 alone will begin to conduct. The cycle of operation will then repeat.

In practice, any number of cycles of alternating current may be applied to the winding before saturation in the core is reversed. However, in the embodiment of our invention illustrated herein, the components of the circuit may be chosen to allow lamps 14 and 16 to flash alternately at a rate of approximately 40–45 times per minute. By varying the size and magnetic properties of reactor 39 the rate of flashing may be adjusted to suit numerous applications.

Inasmuch as very little time (1/120 sec.) expires during each negative alternation, it will occur to those skilled in the art that the light display of each lamp when "on" will appear to observers to be continuous notwithstanding the effect of the negative alternations. As an illustrative example, and assuming that conditions are established to allow each of the lamps 14 and 16 to flash alternately at a rate of 45 times per minute, the flash period of each lamp is roughly 2/3 second which, it can be seen, is thus eighty times greater than the time required for a negative half-cycle. For other flashing rates typically used in practical applications of flasher systems, utilizing the present invention, the diversity between the lighted period of each lamp and a negative alternation will be correspondingly great. Also, it will be understood that the period during which both lamps are simultaneously lit, which period occurs upon reversal of the display conditions of the lamps, consumes an equally small fraction of a second. Thus, the transition of the lamps from one display condition to the other occurs substantially instantaneously.

To discontinue the flashing operation, circuit controller 28 is opened and the series-connected lamps and controlled rectifiers no longer receive energy from the power source. In this event the magnetization of core 38 will reset to negative remanence and the core retains this magnetized condition until the next flashing operation begins.

DIRECT CURRENT OPERATION

The operation of the circuit embodying our invention from a direct current source will now be described.

As previously mentioned, should local conditions become such that the source of alternating current fails, or becomes in any way inoperative, relay 52 becomes de-energized thus closing back contact $b$ and opening front contacts $a$, $c$, and $d$. In accordance with similar considerations outlined hereinabove during the course of description of operation from alternating current source 50, the flux level of core 38 is initially set substantially to negative remanence.

As before, let us assume that it is necessary to excite the flasher circuit. Accordingly, following closure of circuit controller 28, full battery potential is impressed across the series-connected lamps and the controlled rectifiers. Due to the delay to current build-up introduced by winding 32, as discussed hereinabove, controlled rectifier 10 conducts current first. Under these conditions, substantially full battery voltage appears across lamp 14 with the result that lamp 14 is lit. Lamp 16 remains dark. Diode 30 is now forward-biased with respect to the anode voltage of controlled rectifier 12 and the voltage at point 44 in the circuit is substantially the same as that at the anode 23. At this point, essentially the full value of the battery voltage is applied across winding 40, and magnetizing current flows through the winding over a path which extends from the positive terminal of the battery, through back contact $b$ of relay 52, circuit controller 28, lamp 16, diode 30, winding 40, resistor 34, winding 32, and the gate to cathode circuit of controlled rectifier 12 to the negative terminal of the battery. The magnetizing current has, of course, insufficient magnitude immediately to gate controlled rectifier 12 into conduction. The battery voltage across winding 40 eventually causes the magnetic flux in the core to be driven to positive saturation whereupon the voltage at point 42 rises and there is a rush of current through resistor 34 and winding 32 to the gate of controlled rectifier 12. It should be pointed out that diode 36 at this time is reverse-biased relative to the increased potential appearing at point 42 in the circuit which permits the voltage at the gate of controlled rectifier 12 to increase even though anode 19 of controlled rectifier 10 is still at substantially zero potential. The high incidence of gate current in controlled rectifier 12 causes it to conduct and, at this instant, both rectifiers 10 and 12 are conducting and both lamps are on. Rectifiers 10 and 12 will continue to conduct current together until rectifier 10 is returned to the nonconducting state.

During the conduction time of controlled rectifier 10, capacitor 26 is charged substantially to the full value of battery voltage with the right side thereof positive with respect to its left side, as oriented in the drawing. This path for charging capacitor 26 extends from the positive terminal of the battery, through back contact $b$ of relay 52, circuit controller 28, lamp 16, capacitor 26, and through controlled rectifier 10 from plate to cathode to the negative terminal of the battery. Thus, when controlled rectifier 12 is gated into conduction, the voltage on capacitor 26 is impressed across controlled rectifier 10 with anode 19 made negative with respect to cathode 18 by an amount equal to the charge on the capacitor which cuts off controlled rectifier 10. The discharge path for capacitor 26 includes controlled rectifier 12 from its anode to cathode, the battery, back contact $b$ of relay 52, circuit controller 28, and lamp 14 back to the other side of capacitor 26.

With controlled rectifiers 10 and 12 in the nonconducting and conducting states, respectively, capacitor 26 is oppositely recharged with the polarity positive and negative, respectively, on its left- and right-hand sides. This second charge path extends from the positive terminal of the battery, through back contact $b$ of relay 52, circuit controller 28, lamp 14, capacitor 26, and through controlled rectifier 12 from anode to cathode to the negative terminal of the battery. As diode 36 is now forward-biased, the high anode voltage of controlled rectifier 10 is applied to the point 42 in the circuit whereby controlled rectifier 12 achieves a very low resistance state during its conduction period. This potential at point 42 forces magnetizing current through winding 40 in the opposite direction over a circuit which includes winding 40, resistor 29, and the gate to cathode circuit of controlled rectifier 10. The system persists in the above condition until the flux in core 38 is driven to the region of negative saturation. When this occurs, controlled rectifier 10 is again turned on due to the rush of current in its gate circuit and the accumulated charge on condenser 26 instantaneously reverse-biases controlled rectifier 12 and extinguishes conduction therein. The second discharge path for capacitor 26 extends from the side thereof coupled with anode 19, through controlled rectifier 10, the battery, back contact $b$ of relay 52, circuit controller 28, and lamp 16 and back to the other side of capacitor 26. It will be understood that controlled rectifier 10 will conduct during the time necessary to resaturate core 38 in the positive region at which time the flashing sequence will reverse and alternately persist until the circuit is de-energized by the opening of circuit controller 28. As previously discussed, the magnetization of core 38 will be reset to the condition originally established and indicated herein at point 62 when circuit controller 28 is opened.

It is pointed out that, since each discharge path of capacitor 26 includes one of the indicating lamps, lamps 14 and 16 will be lit together momentarily until the transition from one part of the flashing cycle to the other part is completed. The time constant of the discharge path of capacitor 26 depends mainly on the plate to cathode resistance of the controlled rectifier which is gated into conduction, the resistance of the lamp series-coupled with the other controlled rectifier, and the internal resistance of the battery. It will be apparent to those skilled in the art that, by selecting a suitable value for capacitor 26 the time during which lamps 14 and 16 are simultaneously lighted can be made of negligible duration. Further, since the change in magnetization of core 38 from a nonsaturated region to either of the saturation regions occurs sharply, causing an extremely abrupt increase of current through winding 40 and the consequent reinitiation of conduction in the controlled rectifier that was momentarily inactive, it will be apparent that the time required to alternately extinguish and illuminate the lamps can be made extremely short. In practice, therefore, the reversal of one lamp to the "off" state and the simultaneous reversal of the other lamp to its "on" state is substantially instantaneous.

Prior to furnishing the series-connected lamps and controlled rectifiers with direct current power, it is essential to establish a magnetization level in core 38 which ensures that the amount of reverse-biasing energy delivered by capacitor 26 to controlled rectifier 10, following its first conduction period, is sufficient to cause conduction in rectifier 10 to be extinguished when the saturation state beginning at point 68 is attained. For example, as explained hereinabove, the flux in core 38 is initially set substantially to negative remanence. It will be evident, therefore, that unless the voltage on condenser 26 is permitted to rise to a predetermined magnitude sufficient to cut off controlled rectifier 10, the reversal of controlled rectifier 10 to a nonconducting condition will not occur and both controlled rectifiers will definitely remain in the conducting state. Moreover, it will be understood that the initial magnetization of core 38 is not restricted to the condition indicated by point 62 on the B–H curve but may be moved from point 62 toward point 68 any suitable degree which allows capacitor 26 to accumulate a conduction extinguishing charge.

Although we have herein shown and described only one form of switching circuit embodying our invention, it is understood that various changes and modifications may be made therein within the scope of the appended claims without departing from the spirit and scope of our invention.

Having thus described our invention what we claim is:

1. A switching system comprising a source of alternating current, a pair of utilization devices, current switching means respectively in series with said utilization devices for energizing said utilization devices from said source when in a current conducting state, and saturable timing reactor means for energizing said current switching means alternately to current conducting states of a duration proportional to the time required to traverse the nonsaturated regions of said timing reactor means.

2. In combination, two unidirectional current control devices each including an anode, a cathode, and a gate, a load in series with each of said control devices, a pair of input terminals adapted to receive an operating potential connected across said series-connected loads and control devices to form two parallel branches, said input terminals energizing the anode of each control device with a positive potential, a magnetic material device having substantially rectangular hysteresis loop characteristics, a winding on said magnetic material device, asymmetric conductor means in each branch connected to the terminals of said winding and to the anodes of said control devices for isolating the anodes of said control devices from potential drops across said winding, means for cross-connecting through said asymmetric conductor means the gate of each of said control devices and the anode of the other control device, one of said cross-connecting means including a delay element effective upon initial energization of said input terminals to delay conduction of the control device having said delay element in its gate circuit whereby the other of said control devices conducts first, each of said control devices during conduction energizing the load in series association therewith and during cutoff directing a magnetizing force from said input terminals to said winding in such manner as to place said magnetic material device in a saturation condition in accordance with the magnetizing current direction, and means for stopping the conduction of each of said control devices upon the starting of conduction in the other of said control devices whereby their alternate operation is effected.

3. A flasher system comprising a magnetic material device having substantially rectangular loop characteristics, a winding on said magneic material device, a pair of parallel unidirectional current controlling devices gatable into conduction and arranged to conduct current in the same direction, means for applying current to said current controlling devices, a pair of diodes arranged to admit current to said winding from opposite directions and each having an electrode in common with a corresponding electrode of said current controlling devices so that at any instant the same potential level exists at said corresponding mutually connected electrodes, a load device in series with each current controlling device, means for delaying the conduction of one of said current controlling devices relative to the other current controlling device when a gate signal is applied thereto, means for connecting current across said series-connected load devices and current controlling devices so that said one current controlling device begins to conduct with said other current controlling device remaining cut off, means supplying said winding with current through the diode associated with said inactive current controlling device and creating a magnetizing force having a magnitude sufficient to drive said magnetic material device to saturation in one direction, connections between said winding and the current controlling device currently inactive so that upon saturation of said magnetic material device in said one direction the inactive current controlling device is gated into conduction, and means effective upon saturation for extinguishing conduction in the currently active one of said current controlling devices.

4. A flasher circuit comprising two parallel unidirectional current controlling devices arranged to conduct current in the same direction, said control devices having an anode, a cathode, and a gate, a load in series with each of said devices, a pair of input terminals connected across said series-connected loads and current controlling devices and energizable so as to bias said current controlling devices in the forward direction, two asymmetric conductors having anode and cathode electrodes, the anode of each of said asymmetric conductors being common-referenced with a respective anode of one of said current controlling devices, a magnetic material device having substantially sharp saturation characteristics, a winding on said magnetic material device interconnecting the cathodes of said asymmetric conductors, said magnetic material device displaying a first magnetically saturated condition when a magnetizing current is supplied to one end of said winding for a preselected period of time, and a second magnetically saturated condition when a magnetizing current is supplied to the other end of said winding for an essentially equal period of time, means for cross-connecting the cathode of one of said asymmetric conductors and the gate of the current controlling device whose anode is common-referenced with the other asymmetric conductors, a current-buildup delay element cross-connecting the cathode of said other asymmetric conductors and the gate of the current controlling device whose anode is common-referenced with said one asymmetric conductor, said delay element being effective upon initial energization of said input terminals to delay conduction of the current controlling device whose gate is connected therewith to apply a magnetizing force across said winding causing said magnetic material device to be placed in the first saturated condition after said preselected period of time, said winding at saturation permitting the passage to the gate of current controlling device which is cut off of an ignition current which gates it into conduction, and means for extinguishing the first-conducting one of said current controlling devices when saturation of said magnetic material device in the first condition is reached and impressing through said winding a reverse-direction current which causes said magnetic material device to be placed in the second saturated condition, thereby alternately initiating excitation of said loads.

5. A flasher circuit comprising two unidirectional current control devices having anode, cathode, and gate electrodes, a pair of loads each connected in series with one of said control devices, a pair of input terminals connected across said series-connected load and control devices and energizable at times to supply said input terminals with a potential forward biasing said control devices, first and second diodes each including an anode and a cathode, a connection between the anode of one of said control devices and the anode of the one of said diodes, a connection between the anode of the other of said diodes and the anode of the other of said control devices, whereby the anodes of each electrically associated pair of said diodes and control devices are at the same voltage level at any given time, a magnetic device including a winding on a core having a substantially rectangular hysteresis loop, whereby when a current flows through said winding in one direction for a preselected period of time said core may be placed in a first saturated magnetic condition, and when a current flows through said winding in the other direction for an essentially equal period of time said core may be placed in a second saturated magnetic condition, current conducting means for coupling the gate of one of said control devices with the cathode of the diode common-referenced with the other control device, means connected to the cathode of the diode common-referenced with said one control device for normally placing said core in the first saturated magnetic condition, means for delaying the buildup of current coupling the gate of said other control device with the cathode of the diode common-referenced with said one control device, said one control device beginning conduction alone when forward-biased and said other control device when simultaneously forward-biased remaining nonconducting due to said current-buildup delay means to place said core eventually in the other saturated magnetic condition to start conduction in the control device currently nonconducting, and means effective when said core is placed in either of its saturated magnetic conditions for quenching conduction in the control device conducting prior to saturation so that upon reversion of said core from its one saturated condition to the other saturated condition alternate excitation of said loads is initiated.

6. A control circuit for periodically energizing at least one load, a source of direct current, a pair of current switching devices one connected in series with said load across said source and the other connected across said source whereby two parallel paths are formed, a saturable core, a winding on said core unidirectionally connected at both ends across said load such to isolate said switching devices from the potential developed on said winding, means for delaying conduction in a predetermined one of said switching devices when said source initially supplies current so that the switching device inactive at a given instant diverts current to said winding to cause saturation of said core whereby said inactive switching device is triggered into conduction, and means for quenching the conduction in the one of said switching devices conducting prior to the attainment of saturation whereby said parallel paths are energized from said source in a recurring sequence.

7. A control circuit for periodically energizing a pair of load elements from a source of direct current, said circuit comprising, in combination; a pair of switching devices each including an anode connected with one of said load elements, a cathode, and a gate electrode; control means for at times connecting said associated switching devices and load elements across said source, a capacitor interconnecting said anodes, a saturable core, a winding on said core, means for unidirectionally connecting the ends of said winding to said anodes such to normally isolate said anodes from the potential across said winding, means for cross-connecting one end of said winding to the gate of the switching device whose anode is unidirectionally connected with the other end of said winding, delay means cross-connecting said other end of said winding to the gate of the other switching device for delaying conduction in said other switching device in response to the initial supply of current from said source, and means connected with said other end of said winding for placing said core in a predetermined state of saturation enabling said core to be excited toward the opposite state of saturation in response to operation of said control means.

8. A control circuit comprising, a pair of electronic switching devices each comprising an anode, a cathode, and a gate, said gate being effective when the switching device is forward-biased and when supplied with an ignition current for gating said switching device from nonconducting state to a conduction state, said switching devices being arranged to conduct current in the same direction, a load connected in series with at least one of said switching devices, means for at times applying a direct current across the anode and cathode of one of said switching devices and the load device and cathode of the other of said switching devices, a magnetic device including a winding on a core magnetically annealed to have substantially rectangular hysteresis loop characteristics, whereby when a current is supplied to said winding from one direction said core may be placed in a first condition of saturation, and when a current is supplied to said winding from the other direction said core may be placed in a second condition of saturation, a pair of rectifiers including cathodes connected respectively to opposite ends of said winding and anodes connected respectively to the anode of each of said switching devices, whereby the anodes of said switching devices and the rectifiers associated therewith are at the same voltage level at any given instant, means for initially presetting said core in the first condition of saturation, current-buildup delay means associated with the gate of one of said switching devices for delaying conduction in said one switching device when said switching devices are energized to drive said core from its preset first condition of saturation to the second condition of saturation, and means for quenching to conduction of the switching device which initially is rendered conducting to turn said switching devices on and off alternately whereby said load is recurringly energized.

9. In combination with a pair of rectifiers each having an electron-emitting electrode, an electron-receiving electrode, and a control electrode; a flasher circuit comprising a capacitor coupling the electron-receiving electrodes of said rectifiers, current-controlled indicating means connected to receive the current passing through said rectifiers, means for at times forward biasing said rectifiers at the same time from a source of direct current, first and second diodes having cathode and anode elements, one of said rectifiers having its electron-receiving electrode connected to the anode of one of said diodes and the other of said rectifiers having its electron-receiving electrode connected to the anode of the other of said diodes, a core having substantially rectangular hysteresis loop characteristics, a winding on said core interconnecting the cathodes of said diodes whereby when current is supplied to said winding in one direction for a preselected period of time said core may be placed in a first saturated condition, and when current is supplied to said winding in the other direction for an essentially equal period of time said core may be placed in a second saturated condition, one end of said winding being connected to the current originating terminal of said source to normally flux said core to the first saturated condition, an inductor cross-connecting said one end of said winding and the control electrode of the rectifier whose current-receiving electrode unidirectionally connects with the other end of said winding, a resistor cross-connecting said other end of said winding and the control electrode of the rectifier whose electron-receiving electrode unidirectionally connects with said one end of said winding, said inductor delaying buildup of control current when said rectifiers become simultaneously forward-biased whereby the rectifier having said resistor in connection with the control electrode begins conducting first alone and the other rectifier remains nonconducting, said core being fluxed to a point on the hysteresis curve at the other level of saturation whereupon said rectifiers concurrently conduct current, said capacitor becoming charged during said conduction to quench the conduction at saturation of the rectifier currently conducting and thereafter becoming oppositely recharged thereby to cause alternate quenching of conduction in said rectifiers.

10. In combination with a pair of indicating lamps, apparatus for alternately flashing said lamps comprising, a pair of unidirectional current control devices each having an anode, a cathode, and a gate, means for connecting said two cathodes to one terminal of a source of direct current whose other terminal is connected through said lamps, respectively, to the two anodes of said control devices, the terminals of said source being polarized such to bias said control devices in the forward direction, a magnetic device including a winding on a core having a substantially rectangular hysteresis loop, whereby when a current is applied to said winding from one direction for a preselected period of time said core may be placed in a first saturated condition, and when a current is applied to said winding from the other direction for an essentially equal period of time said core may be placed in a second saturated condition, asymmetric conductor means respectively connected between the ends of said winding and the anodes of said control devices for allowing the passage of anode potential of said control devices to said winding but for maintaining anode potential independent of the potential across said winding, a resistance element cross-connecting one end of said winding and the gate of the control device whose anode is unidirectionally connected to the opposite end of said winding, means including a current-buildup delay element for cross-connecting said opposite end of said winding and the gate of the other control device to temporarily delay conduction in the control device whose gate circuit includes said delay element upon said forward biasing of said control devices, whereby when said control devices are forward-biased the control device whose gate circuit includes only said resistance element begins conducting alone and said other control device is cut off and effective to place said core in the second saturated condition at which time the control device cut off prior to saturation begins to conduct, and means responsive to the starting of conduction in each of said control devices for stopping the conduction in the other of said control devices to alternately flash said lamps.

11. In combination with a pair of load elements, a system for alternately operating said load elements from a source of alternating energy and comprising: a pair of current controlling devices arranged respectively to energize one of said load elements when conducting, a circuit controller having an open condition in which neither of said current controlling devices conducts and a closed condition for supplying energizing current to said devices from said source, and saturable magnetic timing reactor means excited when said circuit controller is in its closed condition for energizing said current controlling devices alternately for a predetermined duration proportional to the time required to traverse the nonsaturated regions of said reactor means for causing the operation of said load elements in a recurring sequence.

12. In combination with a pair of load elements, a system for alternately energizing said load elements in a predetermined time sequence and comprising, a pair of input terminals energizable from a source of alternating current, a pair of current switching means for alternately energizing and deenergizing said load elements from said source having corresponding electrodes connected to one terminal and corresponding other electrodes connected to the other terminal through respective ones of said load elements to form two series parts across said terminals, and timing reactor means electrically associated with both of said switching means in a control relation for energizing each of said switching means to a current conducting state for a period proportional to the time required to drive said reactor means from one saturation region to the opposite saturation region.

13. In combination with a pair of load elements and a pair of input terminals energizable with alternating current, means for alternately energizing said load elements in a predetermined time sequence and comprising: a pair of current controlling devices, each including anode, cathode, and gate electrodes, said load elements being respectively arranged in series with each of said current controlling devices across said terminals and having one end electrically associated directly with the anode of the current controlling device in series therewith, a saturable magnetic core having thereon a winding unidirectionally connected to said anodes in such manner to normally maintain said anodes independent of potential level across said winding, a first capacitor electrically associated with one end of said winding and the cathode of a first of said current controlling devices, a second capacitor electrically associated with the other end of said winding and the cathode of the second of said current controlling devices, impedance means in association with the gate of each current controlling device for delaying conduction in the first of said current controlling devices when said terminals become energized simultaneously with conduction beginning alone in the second of said current controlling devices, and means for fluxing said core to such a saturated condition that when said input terminals are energized said core is excited toward the opposite saturated condition concurrently with the beginning of conduction in said second current controlling device.

14. A flasher circuit comprising two unidirectional current controlling devices each having anode, cathode, and gate electrodes, a load connected with each anode to form two series paths, a pair of input terminals across said paths for applying current to said paths, two asymmetric conductors having anode and cathode electrodes, the anode of each asymmetric conductor being common-referenced with the anode of one of said current controlling devices, a magnetic material device having substantially sharp saturation characteristics, a winding on said core interconnecting the cathodes of said asymmetric conductors, means for cross-connecting one end of said winding with the cathode of the current controlling devices whose anode unidirectionally connects with the other end of said winding, means for delaying the buildup of current cross-connecting the other winding end to the gate of the current controlling device whose anode unidirectionally connects with said one winding end, means for energizing said terminals with alternating current in such manner that the current controlling device having said current-buildup delay means in its gate circuit is delayed from conducting upon said energization simultaneous with conduction beginning in the other of said current controlling device, said current controlling device not conducting initially shunting a magnetizing force to said winding of such an amplitude to drive said device to one state of saturation, the current controlling device cut off prior to the one state of saturation being gated into conduction at said saturation to reverse the direction of magnetomotive force supplied to said winding, whereby said core eventually is driven to the other state of saturation, and means for restarting conduction in the currently conducting current controlling device during negative alternations whereby each of said current controlling devices remains conducting for a period in accordance with the time required to reverse the saturation of said core.

15. In combination, a first series circuit comprising a first controlled rectifier and a first load element, a second series circuit comprising a second controlled rectifier and a second load element, means connecting said first and second series circuits into a parallel circuit, means for applying an operating potential to said parallel circuit, means for delaying conduction of said second controlled rectifier upon initial application of said operating potential, an inductor saturable in a first and a second direction, means responsive to said first controlled rectifier being conductive for saturating said inductor in said first direction, means responsive to said inductor becoming saturated in said first direction for rendering said second controlled rectifier conductive and said first controlled rectifier nonconductive, means responsive to said second controlled rectifier being conductive for saturating said inductor in said second direction, and means responsive to said inductor becoming saturated in said second direction for rendering said first controlled rectifier conductive and said second controlled rectifier nonconductive.

16. A flasher circuit comprising, at least one lamp, a controlled rectifier serially connected with said lamp, a second controlled rectifier, means connecting the series circuit of said first controlled rectifier and said lamp in parallel with said second controlled rectifier, means for applying an operating potential to said parallel circuit, means for delaying conduction of said second controlled rectifier upon initial application of said operating potential, an inductor saturable in a first and a second direction, means responsive to said first controlled rectifier being conductive for saturating said inductor in said first direction, means responsive to said inductor becoming saturated in said first direction for rendering said second controlled rectifier conductive and said first controlled rectifier nonconductive, means responsive to said second controlled rectifier being conductive for saturating said inductor in said second direction, and means responsive to said inductor becoming saturated in said second direction for rendering said first controlled rectifier conductive and said second controlled rectifier nonconductive.

17. A flasher circuit comprising, a first series circuit comprising a first controlled rectifier and a first lamp, a second series circuit comprising a second controlled rectifier and a second lamp, means connecting said first and second series circuits into a parallel circuit, means for applying an operating potential to said parallel circuit, means for delaying conduction of said second controlled rectifier upon initial application of said operating potential, an inductor saturable in a first and a second direction, means responsive to said first controlled rectifier being conductive for saturating said inductor in said first direction, means responsive to said inductor becoming saturated in said first direction for rendering said second controlled rectifier conductive and said first controlled rectifier nonconductive, means responsive to said second controlled rectifier being conductive for saturating said inductor in said second direction, and means responsive to said inductor becoming saturated in said second direction for rendering said first controlled rectifier conductive and said second controlled rectifier nonconductive.

18. In combination, a first series circuit comprising a first controlled rectifier and a first load element, a second series circuit comprising a second controlled rectifier and a second load element, means connecting said first and second series circuits into a parallel circuit, means for applying an operating potential to said parallel circuit, means for delaying conduction of said second controlled rectifier upon initial application of said operating potential, an inductor saturable in a first and a second direction, means connecting one end of said inductor to the junction of said first controlled rectifier and said first load element, means connecting the other end of said inductor to the junction of said second controlled rectifier and said second load element, means responsive to said first controlled rectifier being conductive for saturating said inductor in said first direction, means responsive to said inductor becoming saturated in said first direction for rendering said second controlled rectifier conductive and said first controlled rectifier nonconductive, means responsive to said second controlled rectifier being conductive for saturating said inductor in said second direction, and means responsive to said inductor becoming saturated in said second direction for rendering said first controlled rectifier conductive and said second controlled rectifier nonconductive.

19. In combination, a first series circuit comprising a first controlled rectifier and a first load element, a second series circuit comprising a second controlled rectifier and a second load element, each of said controlled rectifiers having an anode electrode, a cathode electrode and a gate electrode, means connecting said first and second series circuits into a parallel circuit, means for applying an operating potential to said parallel circuit, means for delaying conduction of said second controlled rectifier upon initial application of said operating potential, an inductor saturable in a first and a second direction, means connecting one end of said inductor to the junction of said first controlled rectifier and said first load element and to the gate electrode of said second controlled rectifier, means connecting the other end of said inductor to the junction of said second controlled rectifier and said second load element and to the gate electrode of said first controlled rectifier, means responsive to said first controlled rectifier being conductive for saturating said inductor in said first direction, means responsive to said inductor becoming saturated in said first direction for rendering said second controlled rectifier conductive and said first controlled rectifier nonconductive, means responsive to said second controlled rectifier being conductive for saturating said inductor in said second direction, and means responsive to said inductor becoming saturated in said second direction for rendering said first controlled rectifier conductive and said second controlled rectifier nonconductive.

20. A flasher circuit comprising, a first series circuit comprising a first controlled rectifier and a first lamp, a second series circuit comprising a second controlled rectifier and a second lamp, each of said controlled rectifiers having an anode electrode, a cathode electrode and a gate electrode, means connecting said first and second series circuits into a parallel circuit, means for applying an operating potential to said parallel circuit, means for delaying conduction of said second controlled rectifier upon initial application of said operating potential, an inductor saturable in a first and a second direction, means for connecting one end of said inductor to the junction of said first controlled rectifier and said first load element and to the gate electrode of said second conrtolled rectifier, means for connecting the other end of said inductor to the junction of said second controlled rectifier and said second lamp and to the gate electrode of said first controlled rectifier, means responsive to said first controlled rectifier being conductive for saturating said inductor in said first direction, means responsive to said inductor becoming saturated in said first direction for rendering said second controlled rectifier conductive and said first controlled rectifier nonconductive, means responsive to said second controlled rectifier being conductive for saturating said inductor in said second direction, and means responsive to said inductor becoming saturated in said second direction for rendering said first controlled rectifier conductive and said second controlled rectifier nonconductive.

References Cited by the Examiner
UNITED STATES PATENTS

| | | | |
|---|---|---|---|
| 2,912,653 | 11/1959 | Tillman | 331—113.1 |
| 2,916,670 | 12/1959 | Pederson | 315—200.1 |
| 2,920,240 | 1/1960 | Macklen | 315—200.1 |
| 2,954,532 | 9/1960 | Pentecoat et al. | |
| 2,991,427 | 7/1961 | Schulze | 331—151 X |

FOREIGN PATENTS 98,290  6/1961  Netherlands.

HERMAN KARL SAALBACH, *Primary Examiner.*

ARTHUR GAUSS, GEORGE N. WESTBY, S. CHATMON, JR., *Assistant Examiners.*